UNITED STATES PATENT OFFICE.

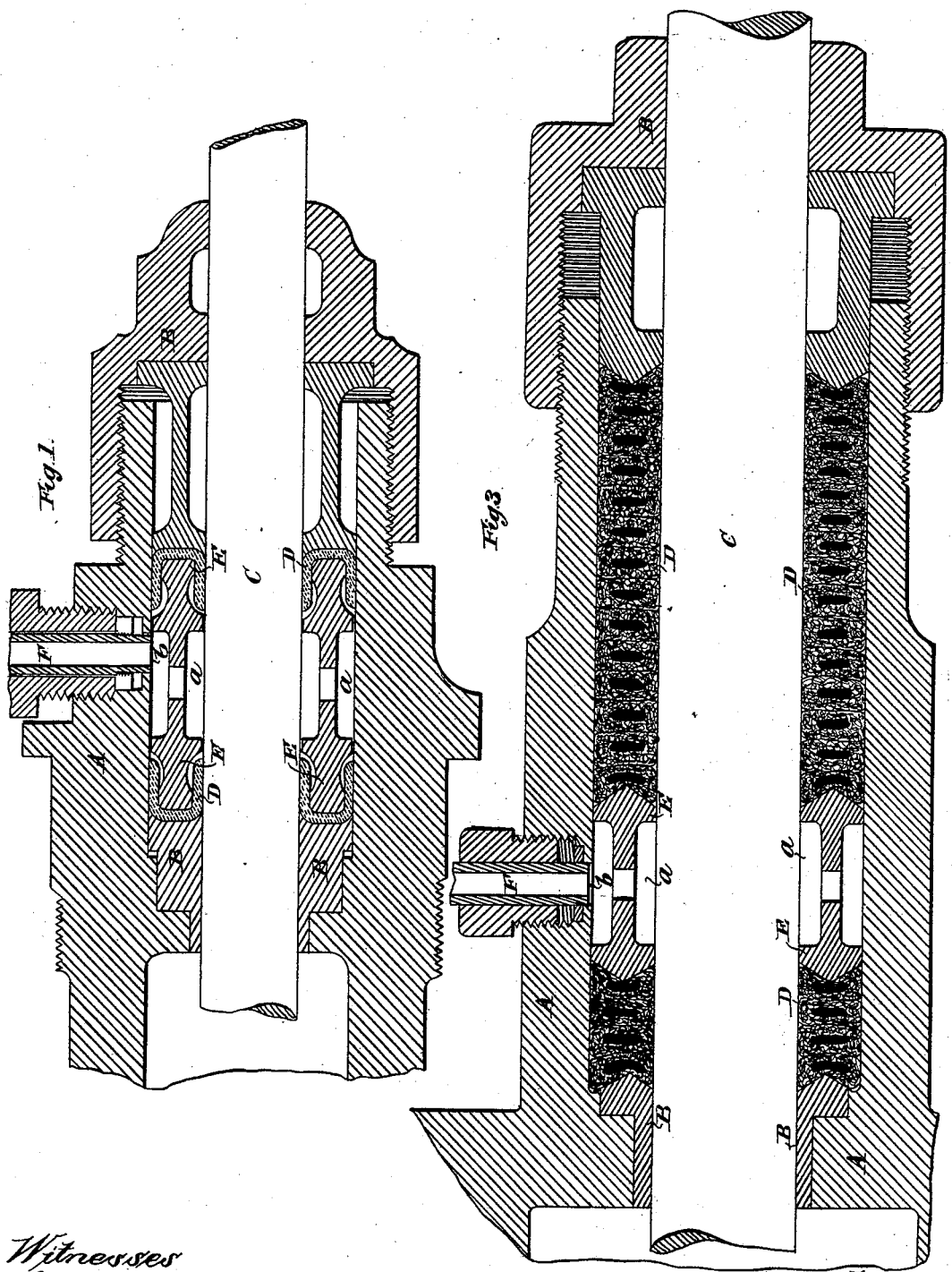

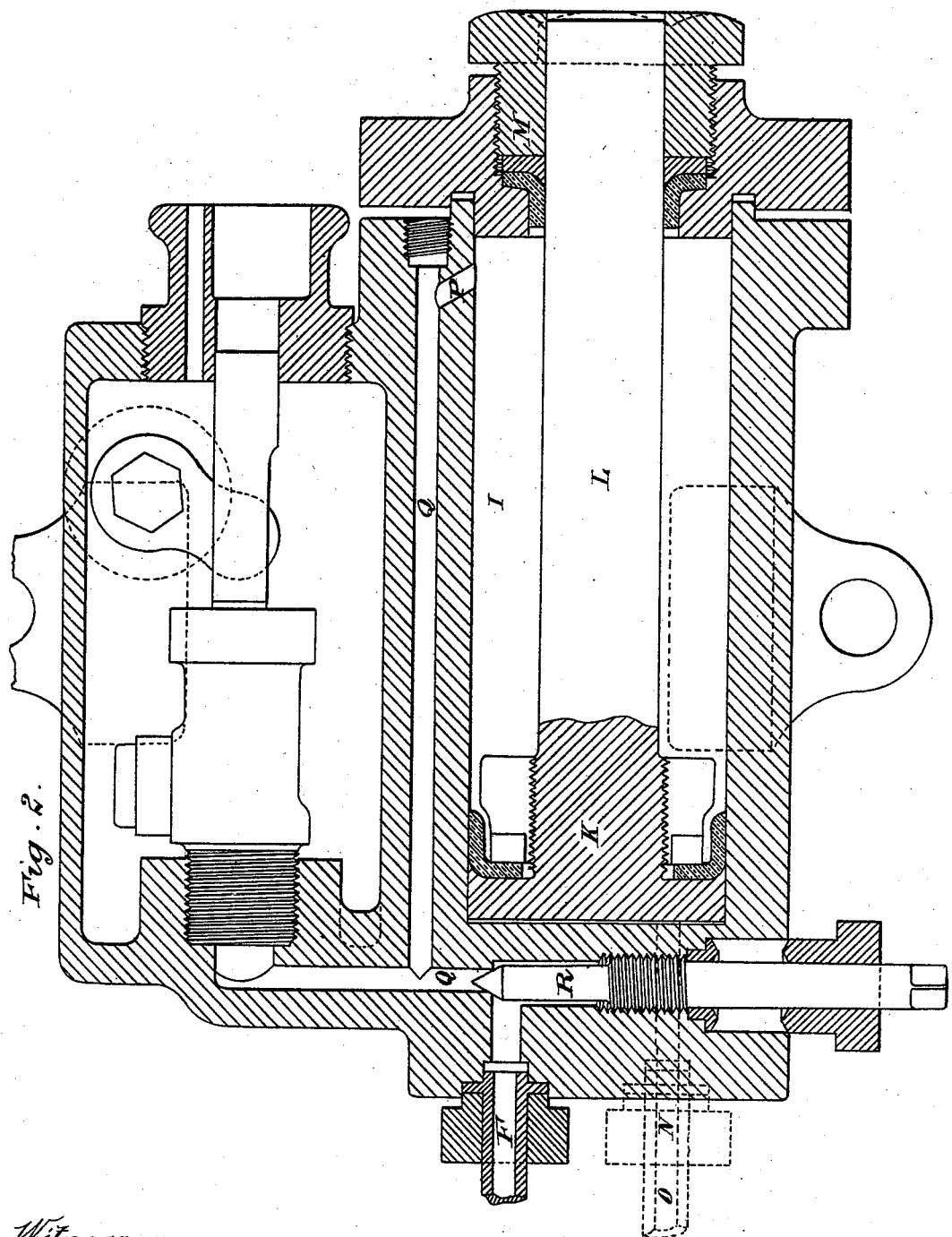

OLIVER JOSOLYNE ELLIS, OF LONDON, ENGLAND, ASSIGNOR TO I. AND E. HALL, LIMITED, OF SAME PLACE.

PACKING FOR PISTON-RODS.

SPECIFICATION forming part of Letters Patent No. 528,773, dated November 6, 1894.

Application filed May 1, 1894. Serial No. 509,668. (No model.) Patented in England October 14, 1889, No. 16,161.

*To all whom it may concern:*

Be it known that I, OLIVER JOSOLYNE ELLIS, engineer, a subject of the Queen of Great Britain and Ireland, residing at 29 Victoria Road, Old Charlton, London, in the county of Kent, England, have invented certain Improvements in Packing for Piston-Rods, (for which I have obtained a patent in Great Britain, No. 16,161, dated October 14, 1889,) of which the following is a specification.

The object of my invention is to provide efficient means for preventing leakage at the glands or stuffing boxes of piston rods of engines using high pressure fluids or of engines for compressing gases or the like.

According to my invention I make a recess in the part constituting the stuffing box through which the piston rod passes and at each end of this recess I preferably place hydraulic or cup leathers. Into this recess I admit fluid preferably of the nature of a lubricant under a pressure greater than the greatest pressure of the fluid in the cylinder so that this greater pressure prevents the leakage of such fluid through the gland or stuffing box, it (where cup leathers are used) pressing the leathers firmly against the surfaces at the joints but admitting of the lubricant in the stuffing box passing by the packing to lubricate the parts beyond. I may derive the pressure from any suitable source. For instance when the invention is applied to engines for compressing gases or other fluids the gas or fluid may be led from the place where the said gas or fluid is under the greatest pressure. The gas or fluid from which the pressure is obtained is caused to press on one side of a piston in a cylinder the other side of the said piston presenting a less area and causing the gas or other fluid on that side to be passed into the aforesaid recess surrounding the piston rod at an increased pressure sufficient to prevent any leakage past the piston rod and yet admit of a portion of the lubricant passing the packing to lubricate the parts beyond.

I will describe my invention and the way it can be carried out in practice more particularly with reference to the accompanying drawings.

Figure 1 is a longitudinal section of a stuffing box of a motive fluid engine provided with cup leather packings. Fig. 2 illustrates the invention as applied to engines or to pumps employed for compressing gases or other fluids in which the gas or fluid under the greatest pressure is caused to act on the piston as aforesaid so as to exert pressure on the gas or fluid in the stuffing box sufficient to prevent leakage through the stuffing box, of the motive fluid or the gas being compressed. Fig. 3 is a similar section of a stuffing box provided with ordinary hempen packing.

A Fig. 1 is the body of the stuffing box and B the brasses or glands through which the piston rod C passes. In the ends of the recess $a$ between the brasses B are cup leather packings D which are kept in position at the ends of the recess by a skeleton brass E. Communicating with the recess $a$ in the stuffing box is a hole or passage $b$ in which is secured one end of a pipe F connected with a steam boiler or other source of fluid pressure greater than the pressure acting on the piston or part connected with the rod C. The recess $a$ may contain glycerine oil or other suitable fluid lubricant, which when acted on by the fluid pressure entering the recess by the pipe F expands the cup leathers D so as to cause them to press against the piston rod with sufficient pressure to prevent the inferior fluid pressure which operates the piston from leaking between the said piston rod and the cup leathers while the superior pressure acting on the lubricant in the recess will cause a portion thereof to leak past the cup leathers and effect the lubrication of the parts beyond.

I (Fig. 2) is a cylinder in which is fitted to slide the piston K provided with a guide rod L which passes through a stuffing box M in the end of the cylinder I. The opposite end of the cylinder, that is the end which is next the face of the piston, having the greater area, is provided with a passage N communicating by a pipe O with the chamber of the fluid compressing engine containing the most highly compressed fluid. The cylinder I on the side of the piston having the smallest area communicates by a port P and passage Q with the pipe F leading to the recess $a$ in the stuffing box A of the piston rod of the compressing engine.

The cylinder I is charged with any suitable fluid (preferably a lubricant) which when the highly compressed gas or other fluid is admitted by the passage N to act on the greater area of the piston K is forced through the port P, passage Q and pipe F and caused to act on the lubricant contained in the stuffing box so as to expand the cup leather or other packing and prevent the gas or other fluid as it is being compressed from leaking past the said packing as hereinbefore described.

R is a valve for closing the passage Q when required to cut off the communication between the cylinder I and the stuffing box A.

The arrangement illustrated by Fig. 3 acts in a similar manner to that shown in Fig. 1 but instead of the cup leather packings therein shown ordinary hempen packing D is employed, a portion thereof being placed at opposite ends of the skeleton brass E. The superior pressure admitted to the recess $a$ prevents the escape of the fluid under inferior pressure past the packing while a portion of the lubricant will be forced past the said packing as in the before described arrangement, to lubricate the parts beyond.

Having now particularly described and ascertained the nature of the said invention and in what manner the same is to be performed, I declare that what I claim is—

In glands or stuffing boxes for packing the piston rods of gas or other fluid compressing engines or the like, the combination of a recess in the stuffing box and means for admitting thereto fluid under pressure greater than that of the fluid whose leakage is to be prevented and a piston with differential areas for giving the said greater pressure, the larger area being acted upon by the pressure in the compressing cylinder, substantially as hereinbefore described.

In testimony whereof I have signed my name to this specification in the presence of two subscribing witnesses.

OLIVER JOSOLYNE ELLIS.

Witnesses:
  H. D. HOSKINS,
  PERCY R. GOLDRING,
*Both of* 31 *Lombard Street, London, E. C.*